(12) United States Patent
Baross

(10) Patent No.: US 11,203,398 B2
(45) Date of Patent: Dec. 21, 2021

(54) BUOY AND INSTALLATION METHOD FOR THE BUOY

(71) Applicant: Axis Energy Projects Group Limited, Aberdeen (GB)

(72) Inventor: John Stephen Baross, Oldmeldrum (GB)

(73) Assignee: Axis Energy Projects Group Limited, Aberdeen (GB)

( * ) Notice: Subject to any disclaimer, the term of this patent is extended or adjusted under 35 U.S.C. 154(b) by 0 days.

(21) Appl. No.: 16/760,078

(22) PCT Filed: Nov. 20, 2018

(86) PCT No.: PCT/GB2018/053359
§ 371 (c)(1),
(2) Date: Apr. 29, 2020

(87) PCT Pub. No.: WO2019/102188
PCT Pub. Date: May 31, 2019

(65) Prior Publication Data
US 2020/0346719 A1 Nov. 5, 2020

(30) Foreign Application Priority Data
Nov. 21, 2017 (GB) ..................................... 1719303

(51) Int. Cl.
*B63B 35/44* (2006.01)
*B63B 21/50* (2006.01)
(Continued)

(52) U.S. Cl.
CPC ............ *B63B 35/44* (2013.01); *B63B 21/502* (2013.01); *B63B 35/003* (2013.01);
(Continued)

(58) Field of Classification Search
CPC ............ E02B 2017/0091; B63B 35/44; B63B 2035/446; B63B 21/502
(Continued)

(56) References Cited

U.S. PATENT DOCUMENTS

| 7,156,586 B2* | 1/2007 | Nim ........................ F03D 13/25 405/223.1 |
| 7,476,074 B2* | 1/2009 | Jakubowski ........... A01K 61/60 415/1 |

(Continued)

FOREIGN PATENT DOCUMENTS

| CA | 2938727 A1 * | 8/2015 | ............. B63B 77/10 |
| CA | 2976943 A1 * | 9/2016 | ............. B63B 39/03 |

(Continued)

*Primary Examiner* — Frederick L Lagman
(74) *Attorney, Agent, or Firm* — Dorton & Willis, LLP; Ryan Willis

(57) ABSTRACT

A buoy (10) comprising a central column (12), an outer frame (14) attached to the central column with buoyancy which may be provided by the outer frame and/or by attached buoyancy units (16). The central column is negatively buoyant and is normally open at one end to allow water to flow in, and create an oscillating water column caused by waves. This water column dampens the effect of wave or other forces on the buoy, thus providing a more stable foundation for a wind powered generator. A further generator may be provided to extract energy from the oscillating water column. The buoy is normally attached to an anchor by one or more tension leg tethers which maintains the buoyancy below the surface of the water which has also be found to increase stability. The anchor may be a modular gravity base anchor.

17 Claims, 3 Drawing Sheets

Figure 1:
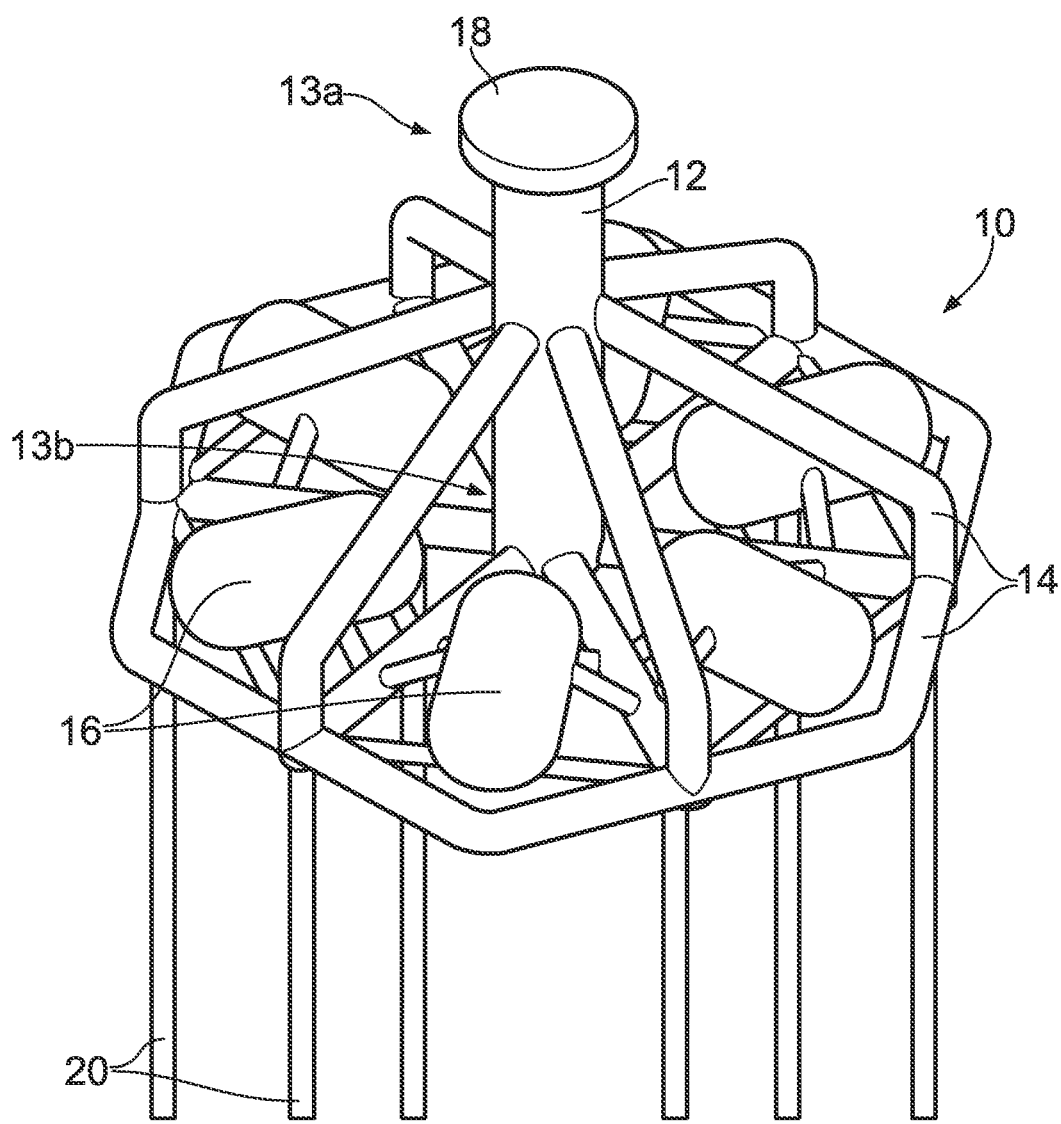

(51) Int. Cl.
  *B63B 35/00* (2020.01)
  *F03B 13/14* (2006.01)
  *E02B 17/00* (2006.01)
(52) U.S. Cl.
  CPC ...... *F03B 13/142* (2013.01); *B63B 2021/505* (2013.01); *B63B 2035/446* (2013.01); *E02B 2017/0091* (2013.01); *F05B 2240/93* (2013.01); *F05B 2270/18* (2013.01)
(58) Field of Classification Search
  USPC ...................................... 405/209, 223.1, 224
  See application file for complete search history.

(56) References Cited

U.S. PATENT DOCUMENTS

| | | | | |
|---|---|---|---|---|
| 7,762,744 | B2* | 7/2010 | Natvig | B63B 35/003 405/209 |
| 8,752,495 | B2* | 6/2014 | Jahnig | B63B 15/02 114/264 |
| 9,394,035 | B2* | 7/2016 | Dagher | B63B 73/30 |
| 9,964,097 | B2* | 5/2018 | Dagher | E02B 17/027 |
| 10,336,404 | B2* | 7/2019 | Dagher | B63B 7/04 |
| 2004/0258483 | A1* | 12/2004 | Vatsvag | B63B 35/003 405/203 |
| 2005/0206168 | A1* | 9/2005 | Murakami | B63B 39/06 290/55 |
| 2008/0240864 | A1* | 10/2008 | Belinsky | E02D 27/52 405/223.1 |
| 2009/0191002 | A1* | 7/2009 | Stabler | B63B 35/003 405/209 |
| 2010/0003134 | A1* | 1/2010 | Edwards | F03B 13/142 416/1 |
| 2010/0143046 | A1* | 6/2010 | Olsen | B63B 27/08 405/209 |
| 2010/0219645 | A1* | 9/2010 | Yamamoto | F03D 13/40 290/55 |
| 2011/0037264 | A1* | 2/2011 | Roddier | F03D 9/25 290/44 |
| 2011/0155038 | A1* | 6/2011 | Jahnig | F03D 13/22 114/264 |
| 2011/0241347 | A1* | 10/2011 | Boureau | F03D 13/10 290/53 |
| 2013/0019792 | A1* | 1/2013 | Jahnig | B63B 1/04 114/267 |
| 2013/0099496 | A1* | 4/2013 | Solheim | A01K 61/60 290/44 |
| 2015/0104259 | A1* | 4/2015 | Johnson | B63B 21/502 405/205 |
| 2015/0252791 | A1* | 9/2015 | Taub | B63B 35/003 405/205 |
| 2016/0075410 | A1* | 3/2016 | Tahar | B63B 21/502 405/223.1 |
| 2018/0148140 | A1* | 5/2018 | Fernandez Gomez | B63B 21/20 |
| 2019/0233060 | A1* | 8/2019 | Moffat | G06N 3/08 |
| 2020/0010155 | A1* | 1/2020 | Robinson | F03D 13/25 |
| 2020/0040865 | A1* | 2/2020 | Shi | B63B 1/107 |

FOREIGN PATENT DOCUMENTS

| | | | | |
|---|---|---|---|---|
| CN | 104229085 A | * | 12/2014 | ............ B63B 35/44 |
| EP | 2382389 B1 | | 8/2013 | |
| EP | 2917097 B1 | | 2/2017 | |
| FR | 3051023 A1 | * | 11/2017 | ............ B63B 1/107 |
| FR | 3052817 A1 | * | 12/2017 | ............ F03D 13/25 |
| GB | 2542548 A | | 3/2017 | |
| JP | 2012201191 A | | 10/2012 | |
| WO | 9011445 A1 | | 10/1990 | |
| WO | WO-2013040871 A1 | * | 3/2013 | ............ F03D 13/25 |
| WO | WO 2013150320 A2 | * | 10/2013 | ............ B63B 77/10 |
| WO | 2014067885 A1 | | 5/2014 | |
| WO | WO-2017157399 A1 | * | 9/2017 | ............ B63B 35/44 |
| WO | WO-2018185309 A1 | * | 10/2018 | ............ F03D 13/25 |
| WO | WO-2019047194 A1 | * | 3/2019 | |
| WO | 2019102188 A1 | | 5/2019 | |
| WO | WO 2019229476 A1 | * | 12/2019 | |
| WO | WO-2020002160 A1 | * | 1/2020 | ............ B63B 1/125 |

* cited by examiner

BUOY AND INSTALLATION METHOD FOR THE BUOY

The present invention relates to a buoy especially for use as a foundation for an offshore wind powered generator.

Renewable energy sources such as wind and wave are increasingly important as governments and industries try to de-carbonise energy production. There are however many engineering and environmental challenges to address if the output from these renewable energy sources is to be increased.

For wind power, there is limited space on land for installing large wind farms. The focus is therefore increasingly turning to offshore sites. These offshore sites address some of the disadvantages of onshore sites but have historically needed to be in shallow water near the coast and with seabed soils that are suitable for the necessary foundations, so that the base of the wind powered generators can stand on the seabed.

Offshore, deepwater sites move the wind powered generators away from the coast but the wind powered generators can then typically not stand on the seabed. Using decommissioned oil and gas platforms has been suggested as one possible solution but other solutions need to be explored.

In accordance with an aspect of the present invention there is provided a buoy comprising:
a central column; and
an outer frame attached to the central column;
wherein buoyancy is provided by the outer frame and/or by buoyancy attached to at least one of the outer frame and the central column; and
wherein the central column is negatively buoyant.

The inventor of the present invention has appreciated that when the buoy is in use and in water, keeping the buoyancy below the surface of the water, and in particular below the lowermost water level, improves the stability of the buoy and therefore also whatever is attached or mounted to the buoy.

In use, the buoyancy remains in the water, below the surface of the water, and in particular below the lowermost water level. In contrast, the central column typically extends from below the surface of the water, and in particular below the lowermost water level, to above the surface of the water.

The buoy may be or may be referred to as a tension leg buoy.

In use the outer frame may be or may be referred to as a lower frame and/or a submerged frame. This is typically with respect to the central column.

The buoyancy of known tension leg buoys is usually provided by a central structure. When the central structure providing some, typically significant buoyancy, is exposed to waves and/or swell, its overall buoyancy changes with changes in the water level relative to the central structure. This causes tension in tethers below to fluctuate as buoyancy values change due to changes in water levels associated tidal effects and/or waves and increases the peak tension in the tethers that the design must cater for.

When the buoyancy of the present invention is attached to at least one of the outer frame and the central column, the buoyancy may comprise one or more tanks. The tanks may be pressurised tanks. The tanks may be pressurised tanks at about 1.5 bar over ambient pressure, typically sea water pressure.

All or substantially all the buoyancy may be provided by tubular members of the outer frame.

Structural supports may be used to attach the outer frame to the central column. The structural supports may be steel wire ropes and/or tensioned steel wire ropes.

The buoy and/or components of the buoy, for example the central column, may be fabricated from reinforced concrete.

The buoy is typically dumb, that is (other than typically being open at the lower end of the central column) it has no sub-surface openings and/or openings that can be operated when the buoy is in and/or under water; has no adjustable ballasting; and has no winches. It may be an advantage of the present invention that when the buoy is dumb, the reliability of the buoy is improved during installation and/or during the life of the buoy when installed in water.

In a further aspect, the invention also provides a buoy system comprising the buoy as described herein attached to an anchor by one or more tension leg tethers and wherein the buoyancy is positioned below the surface of the water.

The buoy is normally attached to an anchor by one or more tethers. The buoy system may comprise the anchor and/or may comprise the one or more tension leg tethers. The one or more tethers are normally attached to the outer frame and the anchor. It may be an advantage of the present invention that the size and or diameter of the outer frame can be selected so as to optimise the mooring offset between the outer frame and the anchor. The one or more tethers may be referred to as one more legs, and/or one or more tension legs. In use, the one or more tethers attached to the outer frame and the anchor are normally vertical.

The inventor of the present invention has appreciated that when the buoy is in use in water, keeping the buoyancy below the surface of the water, and in particular below the lowermost water level, may have the advantage of maintaining the minimum required tether tension during storm conditions. In turn this typically improves the stability of the buoy and therefore also whatever is attached or mounted to the buoy.

The central column typically has a first and second end. The first end is typically uppermost and, in use, out of the water. The second end is typically lowermost and, in use, in the water. The first and/or second end may be open. Typically the second end is open. The first end may be open or closed or partially open.

The central column may be floodable. In use, when the second end is open, water can one or more of flow into, out of and move inside the central column. The water level inside the central column will typically match or at least substantially match the water level outside the column. This typically reduces peak tensions and also minimises tether tension fluctuations of the buoy. The first end of the column may be open or closed or partially open such as to provide a damping effect. The central column in this mode provides an oscillation water column (OWC) that can be harnessed for the production of electricity by means of wave energy conversion (WEC). Additional OWC WEC devices can be installed around the outside of the central column.

The central column may comprise a space frame. The central column may have a central support column. The central support column may help to stiffen the central column and/or reduce the effects of wave loading on the central column. The central column space frame may be triangular shape in plan.

The central column is negatively buoyant and the space frame therefore typically reduces peak tensions and/or minimises tether tension fluctuations of the buoy. It may be an advantage of the present invention that in use, the buoy remains at least substantially vertical, and/or does not roll.

The diameter of the central column may be minimised to reduce metocean effects on the buoy and/or reduce mooring loads and/or tension on the one or more tethers. This may also reduce the size of the anchor required.

The amount of positive buoyancy provided by the outer frame and/or buoyancy attached to at least one of the outer frame and the central column is typically chosen to provide the required tension on the one or more tethers when also considering the mass of a device or devices attached or mounted to the column.

There may be one or more tethers, typically at least three tethers and normally four or more tethers.

The buoy and typically the central column of the buoy may accommodate one or more devices including a wind powered generator; a wave powered generator; a water current turbine; warning signal, for example light or beacon; radar reflector; a radar mast; radar antenna; active Radar Target Enhancer (RTE); LIDAR beacon, a wind turbine, for example a horizontal or vertical axis wind turbine; solar power generator, for example a solar panel; Wave Energy Converter (WEC); Oscillating Water Column (OWC) Wave Energy Converter; submerged current energy converter; recording equipment; metocean recording equipment; battery room; and walkway.

The one or more devices, for example a wind powered generator and/or a wave powered generator are normally attached to the buoy and typically the central column of the buoy. Accommodate typically includes attached to. The one or more devices are normally attached to the first end of the central column. The first end of the central column may be referred to as a platform for the one or more devices.

Optionally the buoy may include a piezoelectric system utilising tension fluctuations in the one or more tethers.

The improved stability of the buoy and therefore also whatever is attached or mounted to the buoy allows the buoy and one or more devices, in this case one or more instruments to measure wind speed and direction, to measure wind direction and speed at different heights above water level, typically Mean Sea Level (MSL), for example at 150 meters, 50 meters and 10 meters.

The buoy may include a connection for power and/or signal transmission. The connection may be for a subsurface umbilical.

In use the buoyancy of the buoy and normally the outer frame typically remains completely and/or permanently submerged and below the Hmax wave trough in the design storm. This aims to ensure tether tensions are maintained and as the buoyancy of the buoy is always fully submerged, tether tension fluctuations due to waves are minimised. In use, by keeping the buoyancy of the buoy submerged, one or more of the effect of the waves is reduced, mooring loads on the one or more tethers is reduced and the size of the anchor required is reduced. This is typically relative to comparative designs.

In use it may be an advantage of the present invention that removing wave induced buoyancy variations thereby reduces tether tension fluctuations and in turn this improves the fatigue life of the one or more tethers. Reducing the peak tension of the one or more tethers reduces the cost of the one or more tethers as they are specified for the peak tension plus a factor of safety.

In use the buoyancy of the buoy typically remains submerged and therefore the total displacement volume of the buoyancy remains constant or at least substantially constant and therefore the positive buoyancy provided by the buoyancy remains constant. The size and/or amount of the buoyancy required may therefore be reduced.

In use, the arrangement of the central, negatively buoyant column; the outer frame attached to the central column; and buoyancy provided by or attached to at least one of the outer frame and the central column, means that, in use, the central column and device attached thereto remains stable and/or clear of green water and/or any roll and/or heave is minimal.

The anchor weight is normally designed to accommodate vertical loading of the tether from the buoy with a factor of safety. The anchor may have a skirt that in use, penetrates the seabed under the anchor's own weight and/or resists lateral loading from metocean effects.

The anchor is typically an open structure, that is water can flow through the anchor. It may be an advantage of the present invention that if water can pass through the anchor, water between the anchor and surface beneath can escape, allowing the skirt to penetrate the surface. The surface is typically the seabed.

When installed, the central column typically extends from below the lowermost sea level to above the uppermost sea level.

It may be an advantage of the present invention that in use, a wave powered generator removes some of the energy transferred from the water to the buoy. The energy may be derived from waves, swell and/or currents. Removal of energy transferred from the water to the buoy typically means that in use, the buoy and therefore the wind powered generator moves less relative to the surface of the water. If the wind powered generator moves less relative to the surface of the water, it may be more stable and/or may be more energy efficient, that is more wind energy can be converted to electrical energy. By damping the system in this manner the rate of change in tether tension is typically slowed, improving tether fatigue life and potentially reducing the design peak tether tension. Reducing the peak tension of the one or more tethers reduces the cost of the one or more tethers as they are specified for the peak tension plus a factor of safety.

It may also be an advantage of the present invention that the combination of wind and wave power generation increases the generating capacity of a system attached to the buoy compared to separate wind and wave powered generators. Also, the wave powered generator can continue to generate power when there is no or little wind for the wind powered generator. This may improve the commercial viability of the system.

The wind powered generator is typically an aerofoil-powered generator. The wind powered generator may be a horizontal-axis wind turbine (HAWT) or a vertical-axis wind turbine (VAWT).

The wave powered generator is typically an Oscillating Water Column (OWC) device.

The Oscillating Water Column (OWC) device typically generates energy from the rise and fall of water, normally in the form of waves. The wave powered generator may be a Wells Turbine. The wave powered generator may be referred to as a Wave Energy Converter (WEC).

The wind powered generator and the wave powered generator are typically used to generate electricity.

It may be an advantage of the present invention that the buoy can be installed in deep water.

The anchor may be a modular gravity base anchor.

The buoy may be mateable with an installation frame. The installation frame may be reusable. The installation frame may be used to help transport the buoy from land to an offshore installation site. It may provide stability during harbour/inshore installation activities, while under tow and during offshore installation. The installation frame may have one or more winches and/or strand jacks. The installation frame may comprise ballast. The ballast may be a fluid, typically water, normally seawater. The ballast may be stored in one or more tanks attached to the installation frame. When the ballast is a fluid, typically water, normally seawater, the ballast may be pumpable into and/or out of the one or more tanks to control the centre of buoyancy of the installation frame and therefore also the buoy, and/or control the position of the installation frame and/or buoy in the water. Alternatively compressed gas such as air may be used to evacuate water from the one or more tanks.

Thus according to a further aspect of the invention, there is provided a method of installing the buoy as claimed in any preceding claim, comprising
  using an installation frame optionally having one or more winches and/or strand jacks, and at least one ballast tank,
  disposing the buoy on the installation frame;
  pumping compressed gas, fluid, water or sea water into and/or out of the at least one ballast tank to control the centre of buoyancy of the installation frame and therefore also the buoy, and/or control the position of the installation frame and/or buoy in the water;
  transporting the frame and buoy to the offshore installation site.

Normally, the wind powered generator is added to the buoy (which is disposed on the installation frame) before being transported to the offshore installation site.

An advantage of embodiments of the present invention is that launch of the buoy and the installation frame can be achieved in shallow water, with light draft preferably below 10 meters, more preferably below 2 meters. Installation of the turbine to the frame and/or buoy may be accomplished by ballasting down in relatively shallow water for example in sea state 4.

During installation, tether tension is typically adjusted and/or optimised to provide stability and typically optimum stability of the buoy. Thus, the tethers are normally attached before the buoy and attached wind powered generator are removed from the installation frame.

The ballasting of the installation frame may be used again at the offshore installation site to facilitate removal of the buoy (and typically attached wind powered generator) from the installation frame. Thus the installation method may include pumping compressed gas, fluid, water or sea water into and/or out of the at least one ballast tank lower the frame in the water and release the buoy from the frame.

It may be an advantage of the present invention that the buoy is typically dumb (other than typically being open at the lower end of the central column), with no sub-surface openings and/or openings that can be operated when the buoy is in and/or under the water; has no adjustable ballasting; and has no winches. In this way the manufacturing costs of the buoy are reduced, and mechanical and/or serviceable components required for installing the buoy are removable back to dock or land as part of the installation frame, not left submerged and exposed on the buoy.

Indeed, unsupported, the buoy of certain embodiments would typically orientate itself in water in an inverted position relative to the normal in-use position. In use, it is held in the correct orientation by the tether(s), and during installation by the installation frame. Thus unlike other buoys, further features do not need to be added in order to make the buoy independently orientate itself in the proper orientation and therefore costs can be mitigated.

Figure 2:
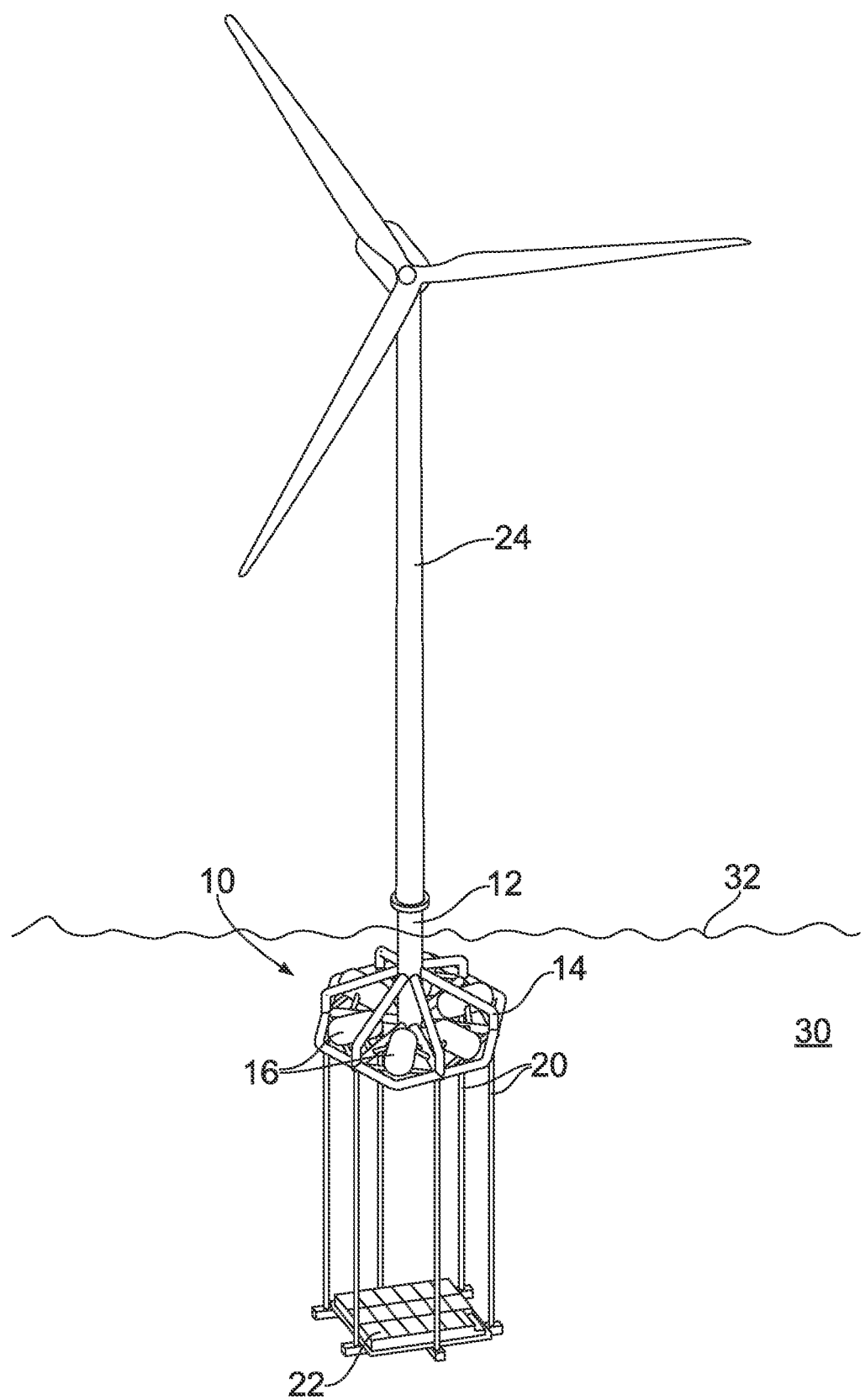
Figure 3:
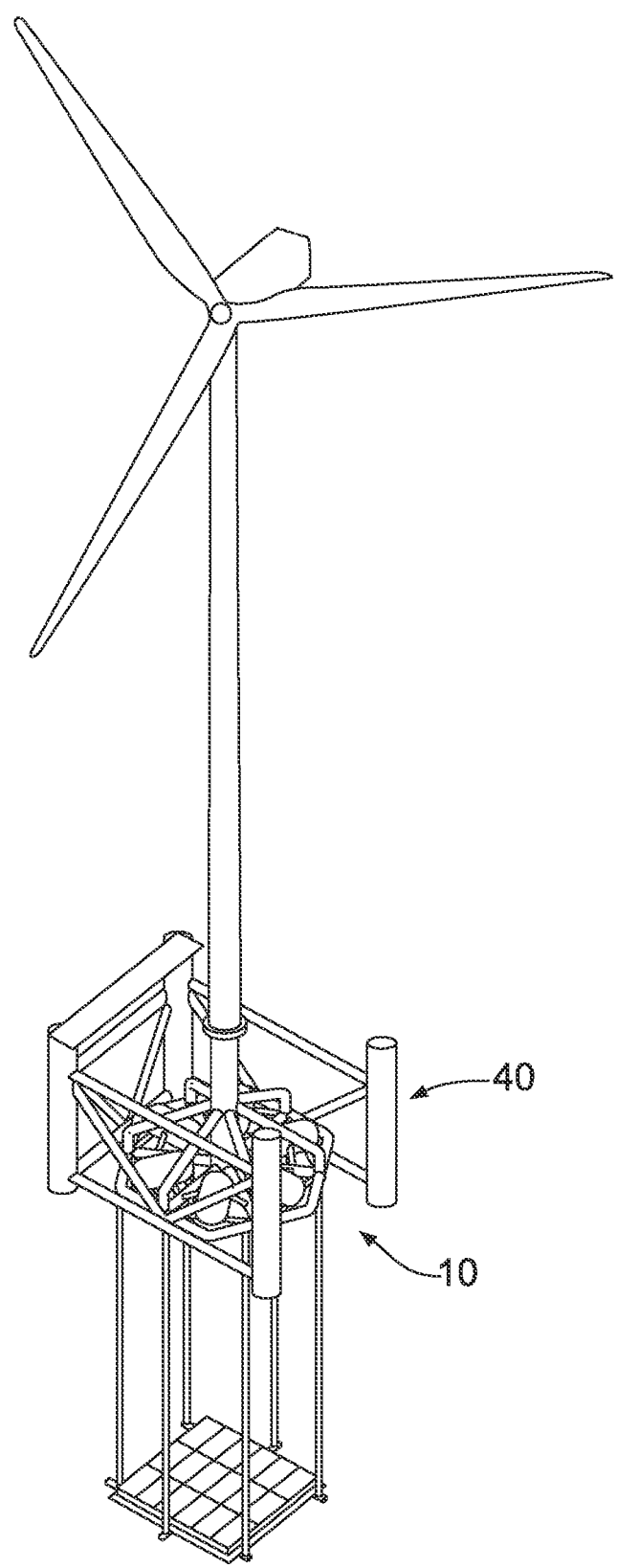

An embodiment of the present invention will now be described by way of example only and with reference to the accompanying drawings, in which:
  FIG. 1 is a schematic view of a buoy;
  FIG. 2 is a schematic view of the buoy and an anchor; and
  FIG. 3 is a schematic view of the buoy, anchor and an installation frame.

FIG. 1 shows a buoy 10 having a central column 12 and an outer frame 14 attached to the central column. Buoyancy 16 is attached to the outer frame 14. The central column 12 is negatively buoyant and floodable.

FIG. 1 is a schematic view of the buoy 10. In practice the central column 12 extends further away from the outer frame 14 than is shown in FIG. 1. The central column 12 has a first 13a and second 13b end. The first end 13a is uppermost and, in use, out of the water (not shown). The second end 13b is lowermost and, in use, in the water (not shown). To facilitate installation the central column 13 may be assembled in sections.

The first 13a and second 13b end of the central column 12 are open. In use water (not shown) can flow into and out of the inside of the central column. The water level inside the central column substantially matches the water level outside the column.

The first end of the central column has a platform 18. One or more devices (not shown), usually a wind powered generator (also commonly referred to as a wind turbine), is attached to the platform.

Six tethers 20 are shown attached to the outer frame 14.

FIG. 2 shows the buoy 10 and an anchor 22. The buoy 10 is attached to the anchor 22 by six tethers 20. The tethers 20 are attached to the outer frame 14 and the anchor 22. The anchor 22 is a modular gravity base anchor.

The anchor 22 weight is designed to accommodate the vertical loading and factor of safety of the tethers from the buoy. The anchor 22 is an open structure, that is water can flow through the anchor.

In use, the buoyancy 16 attached to the outer frame 14 remains in the water 30, below the surface of the water 32. In contrast, the central column 12 extends from below the surface of the water 32 to above the surface of the water.

A wind powered generator 24 is mounted on the top of the column 12. The wind powered generator 24 is an aerofoil-powered generator. The wind powered generator 24 is a horizontal-axis wind turbine (HAWT). The wind powered generator 24 is used to generate electricity.

In use the buoyancy of the buoy is below the surface 32 of the water 30 and the central column is floodable. This reduces tether tension fluctuations; reduces peak tether tension; and improves damping characteristics. In turn this improves the stability of the buoy 10 and therefore also the wind powered generator 24 attached to the buoy.

Modular Gravity Base Anchors are large and heavy. The wind powered generator 24 has an output of equal to or greater than 6 MW. The Gravity Base Anchor therefore may have a total submerged weight of over one thousand tonnes.

The Modular Gravity Base Anchor 24 is re-useable and comprises a steel base accommodating a number of reinforced concrete blocks. The steel base has a number of posts which are used to guide the concrete blocks into position. The Modular Gravity Anchor 24 is installed offshore and at the end of the life of the anchor, the blocks are lifted from the base and the base lifted back to surface for decommissioning and/or re-use.

The Modular Gravity Anchor 24 is designed to facilitate installation of a large anchor without the need for a heavy lifting vessel. Individual lifts are tailored to the lifting weight limit of the chosen installation vessel crane so that an anchor 24 of any submerged weight can be built up within the constraints of the size of the installation crane.

The base of the anchor 24 is provided with a skirt. The skirt extends below the base and helps to mitigate the likelihood of the anchor 24 moving relative to and/or sliding over the seabed. The depth of the skirt is designed to take into account local geotechnical and metocean conditions. The anchor 24 can be installed without diver intervention.

Connectors on the anchor 24 provide attachment points for the tethers 20. The tethers 20 are attached to the connectors using a Remotely Operated Vehicle (ROV). The connectors articulate so to provide movement of the tethers 20 relative to the anchor 24.

FIG. 3 is a schematic view of the buoy 10, anchor 22 and an installation frame 40. The buoy 10 is mateable with the installation frame 40. The installation frame 40 is used to provide stability and help transport the buoy 10 to an offshore installation site. The installation frame 40 comprises ballast tanks that can be filled with seawater. The seawater is pumpable into and out of the tanks to control the buoyancy of the installation frame 40 and therefore also the buoy 10, and therefore control the position of the installation frame 40 and the buoy 10 in the water. Compressed air may be used for dewatering tanks. Tether lengths and tensions are optimised to provide optimum stability of the buoy.

In use, the installation frame 40 with ballast tanks can be submerged in a harbour and the buoy 10 slid thereto. The wind power generator 24 is then installed on the buoy 10, after which the whole system is towed offshore. The tethers 20 may then be attached and the ballast then used again to release the frame from the buoy system, thus installing the wind powered generator.

The buoy 10 is dumb, with no sub-surface openings and no adjustable ballasting of its own. After being used to position the buoy subsea, the installation frame is separated from the buoy 10 and taken back to dock for use in the installation of another buoy.

Modifications and improvements can be incorporated herein without departing from the scope of the invention.

The invention claimed is:

1. A buoy system comprising a buoy attached to an anchor by one or more tension leg tethers, the buoy suitable for supporting a wind powered generator, and comprising:
   a central column; and
   an outer frame attached to the central column;
   wherein buoyancy is provided by the outer frame and/or by buoyancy attached to at least one of the outer frame and the central column;
   the central column being negatively buoyant and being floodable, the central column has a first end which in use is out of the water, and a second end which in use is in the water, and the second end is open; and
   wherein said buoyancy is configured to be positioned below the surface of the water.

2. A buoy system as claimed in claim 1, wherein the central column forms an Oscillating Water Column (OWC).

3. A buoy system as claimed in claim 2, comprising a wave energy converter.

4. A buoy system as claimed in claim 1, wherein the buoy has a central support column to receive the central column.

5. A buoy system as claimed in claim 1, wherein the buoyancy is provided by one or more tanks attached to at least one of the outer frame and the central column.

6. A buoy system as claimed in claim 1, comprising a wind powered generator attached to the buoy.

7. A buoy system as claimed in claim 1, wherein the outer frame is submerged.

8. A buoy system as claimed in claim 1, wherein the central column extends from below the surface of the water to above the surface of the water.

9. A buoy system as claimed in claim 1, wherein the anchor is a modular gravity base anchor.

10. A buoy system as claimed in claim 1, wherein the buoy includes a piezoelectric system utilising tension fluctuations in the one or more tethers.

11. A buoy system as claimed in claim 1, wherein the buoy includes a connection for power and/or signal transmission.

12. A buoy system as claimed in claim 1, wherein the tension leg tethers are vertical.

13. A buoy system as claimed in claim 1, wherein the buoy includes a connection for at least one of power and signal transmission via a subsurface umbilical.

14. A method of installing the buoy system as claimed in claim 1, comprising:
   using an installation frame having at least one ballast tank;
   disposing the buoy on the installation frame;
   pumping compressed gas, fluid, water or sea water into and/or out of the at least one ballast tank to control the centre of buoyancy of the installation frame and therefore also the buoy, and/or control the position of the installation frame and/or buoy in the water;
   transporting the frame and buoy to the offshore installation site;
   attaching the buoy to one or more tension leg tethers connected to an anchor, separating the buoy and the frame;
   positioning the first end of the central column out of the water and the second end of the central column in the water.

15. A method as claimed in claim 14, wherein a wind powered generator is added to the buoy, which is disposed on the installation frame, before being transported to the offshore installation site.

16. A buoy system comprising a buoy attached to an anchor by one or more tension leg tethers: the buoy suitable for supporting a wind powered generator, and comprising:
   a central column; and
   an outer frame attached to the central column;
   wherein buoyancy is provided by the outer frame and/or by buoyancy attached to at least one of the outer frame and the central column;
   the central column being negatively buoyant and being floodable to form an Oscillating Water Column (OWC); and
   wherein said buoyancy is configured to be positioned below the surface of the water.

17. A buoy system comprising a buoy attached to an anchor by one or more tension leg tethers: the buoy suitable for supporting a wind powered generator, and comprising:
   a central column; and
   an outer frame attached to the central column;
   wherein buoyancy is provided by the outer frame and/or by buoyancy attached to at least one of the outer frame and the central column;
   the central column being negatively buoyant and being floodable;
   wherein said buoyancy is configured to be positioned below the surface of the water; and
   wherein the buoy includes a piezoelectric system utilising tension fluctuations in the one or more tethers.

* * * * *